Dec. 29, 1925.
W. GANZ
1,567,259
AUTOMOBILE LOCK
Filed Jan. 28, 1922
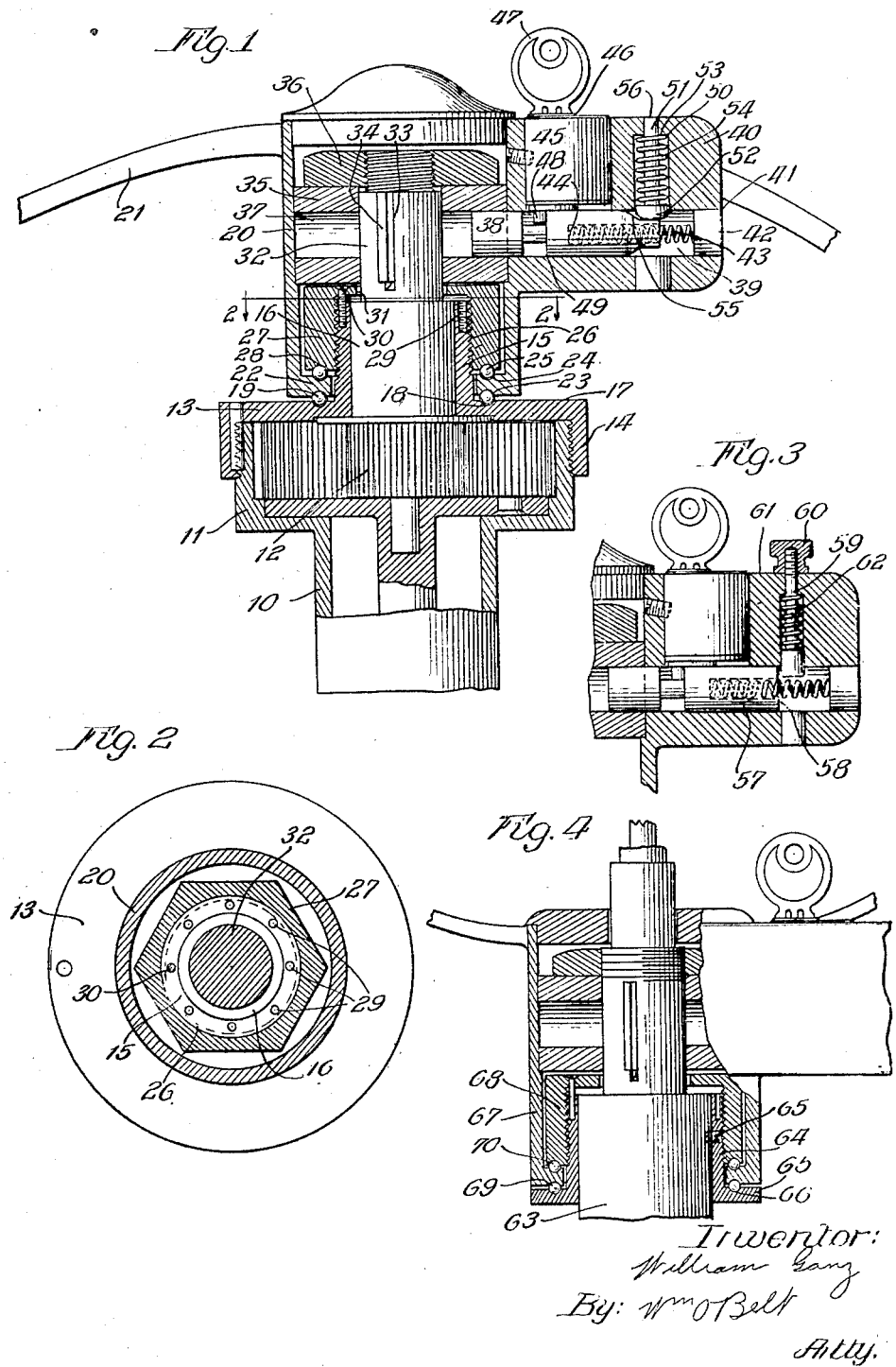

Patented Dec. 29, 1925.

1,567,259

UNITED STATES PATENT OFFICE.

WILLIAM GANZ, OF CHICAGO, ILLINOIS.

AUTOMOBILE LOCK.

Application filed January 28, 1922. Serial No. 532,412.

*To all whom it may concern:*

Be it known that I, WILLIAM GANZ, a citizen of the United States, residing at Chicago, in the county of Cook and State of Illinois, have invented certain new and useful Improvements in Automobile Locks, of which the following is a specification.

This invention relates to steering gears for automobiles and has for its principal object to provide a connection between the steering wheel and the steering shaft whereby they may be securely locked together for operation, and securely locked separate when it is desired to render the automobile inoperative.

Another object of the invention is to indicate to the operator by visible signs whether the car is in operative or inoperative condition.

Another object of the invention is to prevent looseness or wobbling of the steering wheel and to reduce friction between the wheel and the relatively fixed parts.

Other objects of the invention will become apparent as the description is read in connection with the accompanying drawing showing a selected embodiment of the invention, and in which—

Fig. 1 is a vertical sectional view showing an embodiment adapted for steering gears that include planetary gearing;

Fig. 2 is a transverse section on the line 2—2 of Fig. 1;

Fig. 3 is a vertical section showing a modified signal; and

Fig. 4 is a vertical section showing an alternative construction suited to steering gears that do not include planetary gearing.

Referring to Fig. 1, 10 indicates a steering column having a housing 11 at its upper end for planetary gearing 12. In applying the invention I remove the customary cap from the housing and replace it by a combined cap and bearing 13 having a flange 14 to engage with the threads on the housing, and a sleeve 15 forming the bearing for the upper section of the steering shaft 16. The upper face of the disc-like portion 17 of the cap 13, which constitutes an annular flange on the steering column is provided with a ball race 18 in which are assembled the ball bearings 19. A bushing 20 which may be a part of the hub of the steering wheel 21, is equipped with a flange 22 having a ball race 23 on its lower surface, corresponding to the ball race 18 and receiving the upper portions of the ball bearings 19. The upper side of this flange 22 is provided with a ball race 24 adapted to receive a second series of balls 25. The sleeve 15 is threaded on its outer surface at 26 and receives flanged nut 27 which has a ball race 28 in its lower end corresponding to the ball race 24. The upper end of the sleeve 15 is provided with a plurality of threaded openings 29, one of which is adapted to align with an opening 30 in the flange 31 of the nut 27, when the nut has been run down to properly adjust the races on the balls 19 and 25.

The steering shaft section 16 is reduced in diameter at 32 and provided with a keyway 33 for a key 34 by which a collar 35 is secured against rotation thereon. A nut 36 threaded on the upper end of the reduced portion 32 serves to secure the collar 35 in place. This collar 35 is provided with a plurality of radial sockets 37 one of which is adapted to receive a reciprocating bolt 38 mounted in a passage 39 in the enlargement 40 on the hub of the steering wheel. The bolt 38 is inserted through an opening 41 which is afterwards closed by a plug 42 and a spring 43 compressed between the plug 42 and a shoulder 44 within the bolt, tends to move the bolt to the left in Fig. 1 and into one of the sockets 37. A cylinder lock 45 is mounted in the enlargement 40 and provided with a rotatable plug 46 controlled by a key 47. The plug 46 carries a crank pin 48 which operates in a recess 49 in the plunger 38, and serves to move it out of one of the sockets 37, or permit it to enter one of said sockets, according to the operation of the key 47. This locking device is substantially the same as that described and claimed in my co-pending application, Serial No. 507,739, filed October 14, 1921.

In order to indicate to the operator whether or not the plunger 38 is within one of the sockets 37, I provide the enlargement 40 of the wheel hub with a chamber 50 in which is mounted a pin 51 having an enlarged head 52 between which and the shoulder 53 in the chamber, is a compression spring 54 which tends to move the pin 51 downwardly in Fig. 1. The right end of the plunger 38 in Fig. 1 is tapered as indicated at 55, and the pin is of such length that when the left end is properly seated in the socket 37 the incline 55 will be to the left of the head 52 and the pin 51, and permit the upper end 56 of the pin 51 to lie flush with the upper surface of the enlargement 40. When the plunger 38 is moved to the left so as to withdraw it from the socket 37, the incline 55 will force the signal pin 51 upwardly against the resistance of the spring 54 and thereby indicate to the operator that the steering wheel is disconnected from the steering shaft.

In Fig. 3 I have shown a modified form of signal which also acts as a check on the lock. In this form, the plunger 57 has a blunt end 58 and the signal pin 59 is equipped with a knob 60 projecting above the surface 61 of the wheel hub. In this construction it will be obvious that before the plunger 58 can be withdrawn from the socket in the collar to unlock the wheel, the pin 59 will have to be raised from the position shown in Fig. 3, and it will also be clear that while the plunger 57 is in position to let the wheel turn free, the signal pin 59 will be held in raised position. When the lock is operated to engage the wheel with the steering shaft, the plunger 57 will return to the position shown in Fig. 3, and the spring 62 will return the signal pin 59 to the position shown in Fig. 3.

In Fig. 4 I have shown the construction illustrating the application of the invention to a steering gear not involving planetary gearing. In this case, the upper end of the steering column 63 is provided with a flange collar 64 secured thereto by the screws 65 or any other suitable means. The flange 65 at the bottom of this collar corresponds to the disc portion 17 of the cap 13 in Fig. 1, and is provided with a ball race 66 similar to the ball race 18. The bushing 67 corresponds to the bush 20 in Fig. 1, the nut 68 to the nut 27 in Fig. 1, and the ball bearings 69 and 70 correspond to the similarly arranged ball bearings 19 and 25 and are mounted in like ball races. The remaining features of the invention are substantially the same in this application as in the form shown in Fig. 1, and no further description will be required.

By mounting the steering wheel on the steering shaft through ball bearings I eliminate practically all looseness or wobbling in the wheel, whether engaged with the steering shaft or disengaged therefrom, and the nuts 27 and 68 permit the bearings to be kept in proper adjustment so as to compensate for any wear.

The signal devices shown in Fig. 1 make it possible for the operator to tell at a glance whether or not the car is in operative or inoperative condition, and the modified signal devices shown in Fig. 3, while performing the same functions, also make it necessary for the operator to raise the pin 59 before the plunger 57 can be moved to release the steering wheel. This is an additional safety and makes it practically impossible for the wheel to ever become disengaged from the steering shaft while the vehicle is in operation.

I am aware that changes in the form and construction and proportion of parts may be made without departing from the spirit or sacrificing the advantages of the invention, and I reserve the right to make all such changes as fairly fall within the scope of the following claims.

I claim:

1. In a steering gear, a steering column having a flange, a steering wheel having a hub rotatably embracing the column above the flange and having an internal annular flange, a nut on the top of the column and above the internal flange, and anti-friction devices between the nut and the internal flange.

2. In a steering gear, a steering column having a flange, a steering wheel having a hub rotatably embracing the column above the flange and having an internal annular flange, a nut on the top of the column and above the internal flange, anti-friction devices between the nut and the internal flange and other anti-friction devices between the flanges.

3. In a steering gear, a steering column having a flange, a steering shaft journalled in the column and projecting above the top thereof, a steering wheel having a hub rotatably embracing the shaft and the column portion above the flange, a nut on the top of the column, the hub having an internal flange underlying the nut, anti-friction bearings between the two flanges and also between the nut and the internal flange, and locking means carried by the hub and engaging the shaft to lock the wheel thereto.

4. In an automobile, a steering gear, a steering column, a steering shaft rotatably mounted in said column, a steering wheel adapted to rotate said steering shaft, and a combined thrust bearing and a swivel connection between said steering wheel and said steering column.

5. In a steering gear, a steering column having a flange, a steering wheel, anti-friction bearings between said steering wheel and said flange, means to prevent removal of said steering wheel from said steering column, and anti-friction bearings between said steering wheel and said means.

6. In a steering gear, a steering column, having a flange thereon, a steering wheel mounted on said steering column, anti-friction bearings between said steering wheel and said flange, adjustable means for preventing removal of said wheel from said steering column, and anti-friction bearings between said adjustable means and said steering wheel.

7. In a steering gear, a steering column having a flange thereon, a steering wheel mounted on said steering column, anti-friction bearings between said steering wheel and said flange, a nut threaded on said steering column and preventing removal of said steering wheel from said column, and anti-friction bearings between said nut and said steering wheel.

8. In a steering gear, a steering column having an annular flange below the top thereof, a steering wheel having a hub provided with an internal annular flange rotatably embracing the steering column above the column flange, anti-friction devices between the two flanges, a nut threaded upon the upper end of the steering column, and anti-friction devices between the nut and the hub flange.

WILLIAM GANZ.